United States Patent
Fleming

(10) Patent No.: US 9,030,428 B2
(45) Date of Patent: May 12, 2015

(54) GENERATING HAPTIC EFFECTS FOR DYNAMIC EVENTS

(75) Inventor: Jason D. Fleming, San Jose, CA (US)

(73) Assignee: Immersion Corporation, San Jose, CA (US)

(*) Notice: Subject to any disclaimer, the term of this patent is extended or adjusted under 35 U.S.C. 154(b) by 235 days.

(21) Appl. No.: 13/546,351

(22) Filed: Jul. 11, 2012

(65) Prior Publication Data

US 2014/0015761 A1  Jan. 16, 2014

(51) Int. Cl.
*G06F 3/01* (2006.01)

(52) U.S. Cl.
CPC ........................ *G06F 3/016* (2013.01)

(58) Field of Classification Search
None
See application file for complete search history.

(56) References Cited

U.S. PATENT DOCUMENTS

| | | | |
|---|---|---|---|
| 5,619,628 A | 4/1997 | Fujita et al. | |
| 6,449,019 B1 | 9/2002 | Fincher et al. | |
| 7,594,180 B1 | 9/2009 | Langmacher et al. | |
| 7,765,333 B2 | 7/2010 | Cruz-Hernandez et al. | |
| 8,085,170 B2 | 12/2011 | Li | |
| 8,279,193 B1 | 10/2012 | Birnbaum et al. | |
| 2008/0198139 A1 | 8/2008 | Lacroix et al. | |
| 2008/0294984 A1 | 11/2008 | Ramsay et al. | |
| 2009/0231271 A1 | 9/2009 | Heubel et al. | |
| 2010/0066512 A1* | 3/2010 | Rank | 340/407.2 |
| 2010/0287311 A1 | 11/2010 | Cruz-Hernandez et al. | |
| 2012/0081337 A1* | 4/2012 | Camp et al. | 345/177 |
| 2013/0207904 A1 | 8/2013 | Short et al. | |

OTHER PUBLICATIONS

Henry Da Costa et al., U.S. Appl. No. 13/667,003, filed on Nov. 2, 2012.
Henry Da Costa et al., U.S. Appl. No. 13/709,157, filed on Dec. 10, 2012.

* cited by examiner

*Primary Examiner* — Amr Awad
*Assistant Examiner* — Andre Matthews
(74) *Attorney, Agent, or Firm* — Miles & Stockbridge P.C.

(57) ABSTRACT

A system that generates a dynamic haptic effect for a dynamic event receives a first endpoint and a second endpoint for dynamic events. The first endpoint includes a first endpoint value and a corresponding first haptic effect, and the second endpoint includes a second endpoint value and a corresponding second haptic effect. The system receives a dynamic value for the dynamic event. The dynamic value is between the first endpoint value and the second endpoint value. The system then determines the dynamic haptic effect from the dynamic value by interpolating the dynamic haptic effect from the first haptic effect and the second haptic effect.

22 Claims, 4 Drawing Sheets

GENERATING HAPTIC EFFECTS FOR DYNAMIC EVENTS

FIELD

One embodiment is directed generally to haptic effects, and in particular to generating haptic effects in response to a dynamic event.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, referred to as "handheld devices" or "portable devices", such as cellular telephones, personal digital assistants ("PDA"s), smartphones, and portable gaming devices. For example, some portable gaming applications are capable of vibrating in a manner similar to control devices (e.g., joysticks, etc.) used with larger-scale gaming systems that are configured to provide haptic feedback. Additionally, devices such as cellular telephones and smartphones are capable of providing various alerts to users by way of vibrations. For example, a cellular telephone can alert a user to an incoming telephone call by vibrating. Similarly, a smartphone can alert a user to a scheduled calendar item or provide a user with a reminder for a "to do" list item or calendar appointment. Further, haptic effects can be used to simulate "real world" dynamic events, such as the feel of a bouncing ball in a video game.

SUMMARY

One embodiment is a system that generates a dynamic haptic effect for a dynamic event. The system receives a first endpoint and a second endpoint for dynamic events. The first endpoint includes a first endpoint value and a corresponding first haptic effect, and the second endpoint includes a second endpoint value and a corresponding second haptic effect. The system receives a dynamic value for the dynamic event. The dynamic value is between the first endpoint value and the second endpoint value. The system then determines the dynamic haptic effect from the dynamic value by interpolating the dynamic haptic effect from the first haptic effect and the second haptic effect.

DETAILED DESCRIPTION

Figure 1:
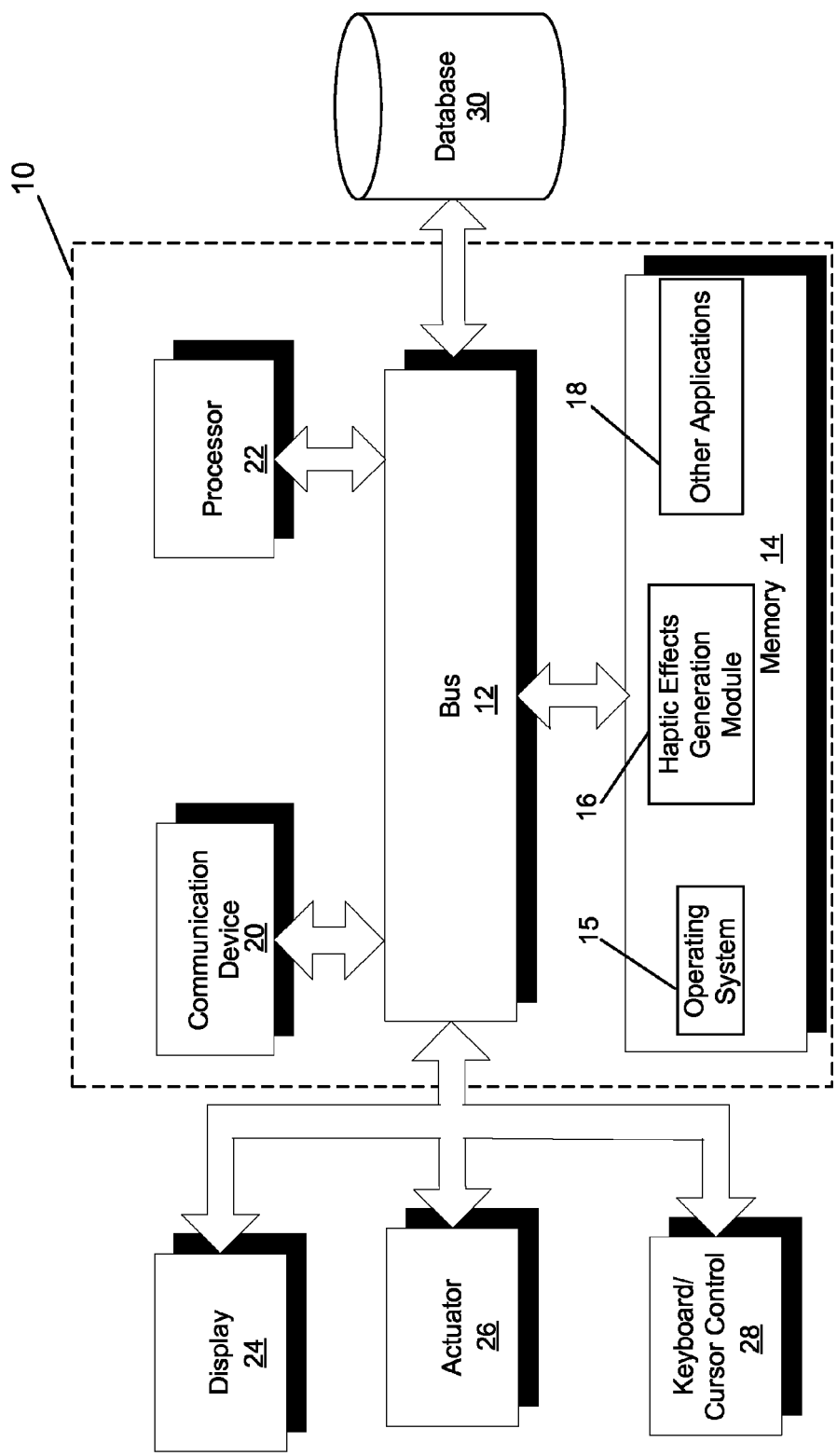
FIG. 1 illustrates a block diagram of a haptically enabled system in accordance with one embodiment of the invention.

One embodiment is a system that generates haptic effects for "dynamic events" such as a simulated bouncing ball. The system receives the desired haptic effects for the "endpoints" of the dynamic event, such as the minimal and maximum force when the ball contacts a wall. The system then uses interpolation to automatically generate haptic effects for dynamic events that fall between the endpoints.

Devices that incorporate haptic effects generally are developed with the cooperation of both haptic effect designers, who determine what the haptic effects should "feel" like, and haptic effect programmers that develop software code to implement the designed haptic effects. In many systems, an application programming interface ("API") separates the work of the designer from the programmer so that a designer can call a desired haptic effect by name, and the API retrieves the corresponding code or routine to implement the desired haptic effect. One example of an API for haptic effects is the "VibeTonz" API from Immersion Corp.

Haptic effects are frequently used to simulate "dynamic" real world events. For example, a video game may feature a ball bouncing off of a wall. Depending on the speed/force of the ball against the wall, a haptic effect that simulates the collision of a bounce must to be varied to reflect the force that would have been generated by the collision in the real world. The haptic effect can be varied by changing parameters. As another example, a smartphone may display a scrolling list of contacts. As the list scrolls, a haptic effect may generate a "tick" haptic effect feel between contacts. As the speed of the scrolling increases, the tick should get stronger to reflect the increased speed, and vice versa. In one embodiment, when a haptic effect is vibratory and is generated by an actuator, the haptic effect can be varied to simulate dynamic haptic events by varying any combination of magnitude, frequency and duration of the vibration parameters. Other examples of dynamic events that can generate corresponding haptic effects include the force of a boxing glove hitting a person, the force of a bat hitting a ball the force of a car colliding with another object, etc.

For many simulations, the number of dynamic events for which a corresponding haptic effect is generated can be fairly large. For example, for the ball bouncing against the wall, a video game may specify ten or more different forces generated by the ball against the wall depending on the speed of the ball. Most designers, in designing haptic effects for these forces, will merely specify the parameters for the endpoints (i.e., the smallest force and the largest force). The programmer then must program all parameters in between the endpoints using linear mapping or some other method. Depending on the number of intermediate points, this may require a large effort on behalf of the programmer. In contrast, embodiments of the present invention automatically generate intermediate stage haptic effects based on the endpoints using interpolation.

FIG. 1 illustrates a block diagram of a haptically enabled system 10 in accordance with one embodiment of the invention. In one embodiment, system 10 is part of a mobile device, and system 10 provides haptic effect generation for the mobile device. Although shown as a single system, the functionality of system 10 can be implemented as a distributed system, and can generate the haptic effects on system 10 itself, or send haptic effects signals or data to another device which then generates the haptic effects.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptic effects generation module 16 that generates haptic effects using interpolation, as disclosed in more detail below. System 10 will typically include one or more additional application modules 18 to include additional functionality, such as smartphone related applications (if system 10 is a smartphone), APIs, a physics system, etc. System 10 may further be coupled to a database 30 for storing data used by modules 16 and 18.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touchscreen, configured to send and receive signals from processor 22, and may be a multi-touch touch screen. Processor 22 is further coupled to a keyboard or cursor control 28, such as a mouse, that allows a user to interact with system 10.

System 10, in one embodiment, further includes an actuator 26. Processor 22 may transmit a haptic signal associated with a generated haptic effect to actuator 26, which in turn outputs haptic effects such a vibrotactile haptic effects. Actuator 26 includes an actuator drive circuit. Actuator 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In other embodiments, a separate device from system 10 includes an actuator that generates the haptic effects, and system 10 sends generated haptic effect signals to that device through communication device 20.

Figure 2:
FIG. 2 illustrates an example of a dynamic event that generates a force for which a haptic effect is generated.

FIG. 2 illustrates an example of a dynamic event that generates a force for which a haptic effect is generated. In FIG. 2, a ball hits one of four walls. Each collision with a wall generates a "force" that varies depending on the speed of the ball. The "ball" and "walls" of FIG. 2 can be part of a video game shown on display 24 of system 10 of FIG. 1 in one example. A "physics system" is part of the dynamic event and determines a real world equivalent force, velocity, etc. associated with the dynamic event. The physics system can be computer software that provides an approximate simulation of certain physical systems, such as rigid body dynamics (including collision detection), soft body dynamics, and fluid dynamics. In other embodiments, rather than generating a physics system based dynamic event, the input may be, for example, time in an animation where the force changes as a function of time.

Figure 3:
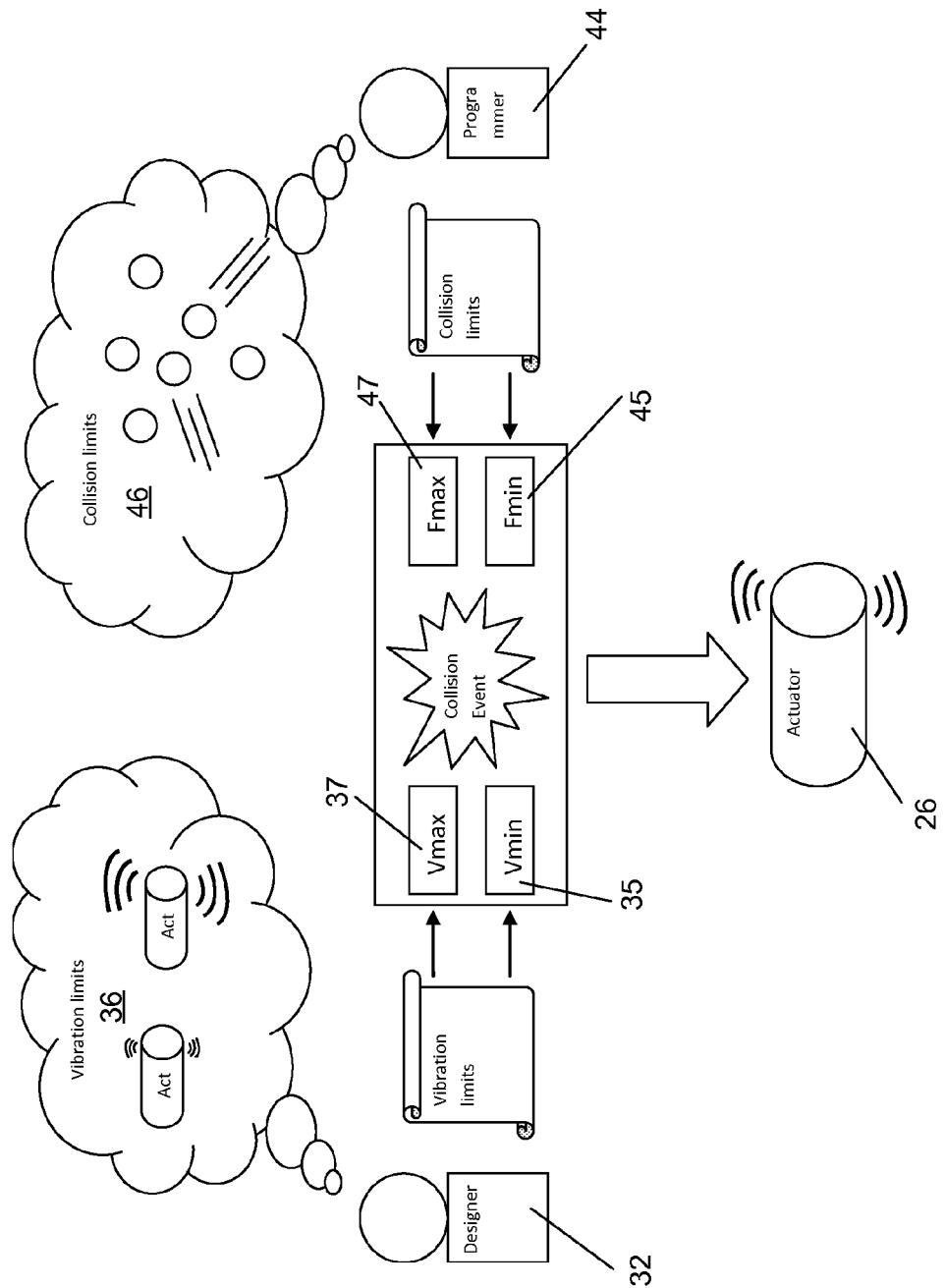
FIG. 3 illustrates the typical interaction between a haptic effect designer and a haptic effect programmer when creating haptic effects that reflect a collision of the ball against the wall of FIG. 2, or other dynamic events, in accordance with one embodiment.

FIG. 3 illustrates the typical interaction between a haptic effect designer 32 and a haptic effect programmer 44 when creating haptic effects that reflect a collision of the ball against the wall of FIG. 2, or other dynamic events, in accordance with one embodiment. Designer 32 designs the "feel" of the haptic effect that corresponds to each collision. Designer 32 specifies the endpoint range of vibration parameters (e.g., minimum and maximum values Vmin 35 and Vmax 37 for strength and periodicity) based on knowledge of the feeling of the target device. The vibration limits 36 reflect the endpoints of the range and specify signals for actuator 26 to generate haptic effects for the smallest force, and haptic effects for the largest force. The endpoints may not be the "absolute" endpoints of a range. Instead, the "endpoints" may be intermediate endpoints between two additional values that may also be considered endpoints. For example, for a range of 1-10, the endpoints chosen may be 3 and 7.

Programmer 44 programs processor 22 of FIG. 1 so that the haptic effect signals are generated. Programmer 44 specifies a range of force inputs (e.g., minimum and maximum values Fmin 45 and Fmax 47) based on knowledge of the range of typical values from the physics system or simulation. The collision limits 46 reflect the minimum and maximum force that would be generated by the ball hitting a wall.

In operation, embodiments calculate the collision force of a particular dynamic event that may fall between the endpoints (i.e., not the smallest force and not the largest force). The output to actuator 26 is interpolated from the programmer's collision limits 46 to the designer's vibration limits 36.

Figure 4:
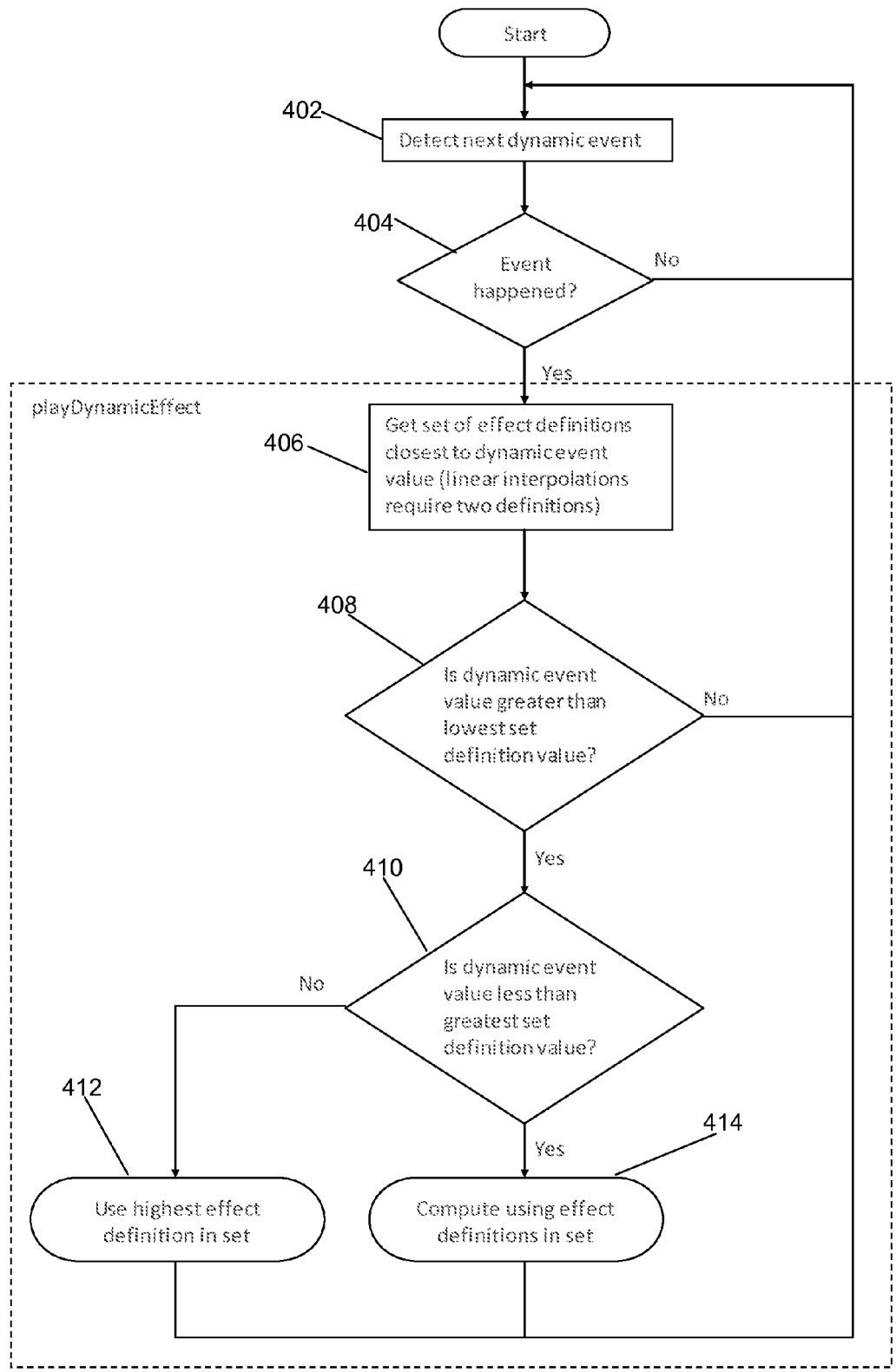
FIG. 4 is a flow diagram of the functionality of the haptic effects generation module of FIG. 1 when using interpolation to automatically generate haptic effects for dynamic events in accordance with one embodiment.

FIG. 4 is a flow diagram of the functionality of haptic effects generation module 16 of FIG. 1 when using interpolation to automatically generate haptic effects for dynamic events in accordance with one embodiment. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, the next dynamic event is detected. The functionality of FIG. 4 is executed as a continuous loop so a dynamic event is always detected.

At 404, it is determined if the dynamic event (e.g., a collision of a ball into a wall) happened. If No at 404, the functionality continues at 402. If Yes at 404, the physic systems provides a dynamic event value. In the example of FIG. 2, the event is the collision, and the dynamic event value is the collision force (e.g., 8 on a scale of 1-10). The dynamic event value is passed to a routine in one embodiment called "playDynamicEffect." In one embodiment, the dynamic event value is passed to the routine as follows:

playDynamicEffect("collision", force); where 'collision" is the name of the haptic event, and the force is the value of the haptic event.

For example, assume the following effects are defined in an effects file:

Name="collision 1", Duration=10 ms, Magnitude=0, Period=5 ms;
Name="collision 10", Duration=50 ms, Magnitude=10000, Period=5 ms.

In this example, the haptic effects are defined by three parameters: duration, magnitude, and period.

At 406, the set of effect definitions closest to the dynamic event value are retrieved from the effects file. A linear interpolation in one embodiment requires at least two definitions. In the above example, these effects are found by their common name "collision", and include "collision 1" and "collision 10". More than two effects can be defined and retrieved from the effects files. For example, the following three effects may be defined in an effects file:

Name="collision 0.25", Duration=10 ms, Magnitude=0, Period=5 ms;
Name="collision 1", Duration=10 ms, Magnitude=0, Period=5 ms;
Name="collision 10", Duration=50 ms, Magnitude=10000, Period=5 ms.

At 408 and 410, a determination is made as to whether the dynamic event value falls between the two definition values. For example, module 16 determines that "8" is between the "1" and "10" encoded in the names of the definition values.

If the dynamic event value is greater than the lowest set definition value at 408, in one embodiment no effect is played and the functionality continues to 410. This provides for a "deadband" where input forces are ignored. In another embodiment, the smallest effect definition in the set may be used and the functionality then returns to 402.

If No at 408, if the dynamic event value is less than the greatest set definition value at 410, the highest effect definition in the set is used at 412 (e.g., 10) and the functionality returns to 402.

If Yes at 410, at 414 the haptic effect definition is determined by interpolation at 414 and the functionality returns to 402.

In order to determine the haptic effect by interpolation at 414, in one embodiment an interpolation variable "t" is determined using the following:

$$t=(\text{dynamic event value}-\text{lowest value dynamic event})/(\text{highest value dynamic event}-\text{lowest value dynamic event})$$

For the above example, t=(8−1)/(10−1), so t is approximately equal to 0.78.

In a special case when the highest value dynamic event equals the lowest value dynamic event, t=1 to avoid division by zero.

In one embodiment, t is used in the following linear interpolation function:

$$(1-t)*A+t*B$$

to calculate each interpolated haptic effect parameter, where "A" is the parameter value for the lowest value dynamic event, and "B" is the parameter value for the highest value dynamic event. For the above two effects example, the parameters are determined as follows:

$$\text{Duration}=(1-t)*10+t*50=41 \text{ ms};$$

$$\text{Magnitude}=(1-t)*0+t*10000=7778;$$

$$\text{Period}=(1-t)*5+t*5=5 \text{ ms}.$$

Therefore, after 414, the interpolated haptic parameter values (i.e., 41 ms duration, 7778 magnitude, 5 ms period) are output to actuator 26 of FIG. 1, or another actuator, either indirectly or directly, to cause the haptic effect to be generated. The functionally then returns to 402 to wait for another dynamic event to happen.

In another embodiment, instead of two haptic effect definitions (i.e., the two endpoints), three haptic effect definitions are used as described above. In this embodiment, the following quadratic equation is used for the interpolation:

$$(1-t)^2*A+2*(1-t)*t*B+t^2*C,$$

where C is the third definition.

As disclosed, embodiments allow a haptic effect designer to more easily implement rich haptic effects by specifying the desired haptic effect endpoints. Embodiments then automatically generate intermediate stage haptic effects through interpolation.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to generate a dynamic haptic effect for a dynamic event, the generating the dynamic haptic effect comprising:

receiving a first endpoint and a second endpoint for dynamic events, wherein the first endpoint comprises a first endpoint value and a corresponding first haptic effect, and the second endpoint comprises a second endpoint value and a corresponding second haptic effect, wherein the first haptic effect comprises a plurality of first parameters and the second haptic effect comprises a plurality of second parameters;

receiving a dynamic value for the dynamic event, wherein the dynamic value is between the first endpoint value and the second endpoint value; and determining the dynamic haptic effect from the dynamic value, wherein the determining comprises interpolating the dynamic haptic effect from the first haptic effect and the second haptic effect;

wherein the interpolating comprises generating an interpolation value (t) that is a function of the first endpoint value, the second endpoint value, and the dynamic value;

wherein the interpolation value (t) comprises: (dynamic event value−first endpoint value)/(second endpoint value−first endpoint value);

wherein the first endpoint value is a lowest endpoint value, and the second endpoint value is a highest endpoint value; and wherein the interpolating further comprises, for each parameter of the dynamic haptic effect, calculating each parameter as a function of the interpolation value (t), a corresponding first haptic effect parameter, and a corresponding second haptic effect parameter.

2. The non-transitory computer readable medium of claim 1, wherein the dynamic haptic effect is a vibratory haptic effect and comprises a plurality of parameters.

3. The non-transitory computer readable medium of claim 2, wherein the plurality of parameters comprise duration, magnitude and period.

4. The non-transitory computer readable medium of claim 2, wherein the vibratory haptic effect is generated by an actuator.

5. The non-transitory computer readable medium of claim 1, wherein the dynamic event comprises a force.

6. The non-transitory computer readable medium of claim 5, wherein the force comprises a simulated object contacting another simulated object.

7. The non-transitory computer readable medium of claim 5, wherein the force is generated by a physics system.

8. The non-transitory computer readable medium of claim 1, wherein the interpolating comprises, for each parameter of the dynamic haptic effect, calculating each parameter as (1−t)*A+t*B, wherein A comprises the corresponding first haptic effect parameter and B comprises the corresponding second haptic effect parameter.

9. A computer-implemented method for generating a dynamic haptic effect for a dynamic event, the method comprising:
   receiving a first endpoint and a second endpoint for dynamic events, wherein the first endpoint comprises a first endpoint value and a corresponding first haptic effect, and the second endpoint comprises a second endpoint value and a corresponding second haptic effect, wherein the first haptic effect comprises a plurality of first parameters and the second haptic effect comprises a plurality of second parameters;
   receiving a dynamic value for the dynamic event, wherein the dynamic value is between the first endpoint value and the second endpoint value; and
   determining the dynamic haptic effect from the dynamic value, wherein the determining comprises interpolating the dynamic haptic effect from the first haptic effect and the second haptic effect;
   wherein the interpolating comprises generating an interpolation value (t) that is a function of the first endpoint value, the second endpoint value, and the dynamic value;
   wherein the interpolation value (t) comprises: (dynamic event value−first endpoint value)/(second endpoint value−first endpoint value);
   wherein the first endpoint value is a lowest endpoint value, and the second endpoint value is a highest endpoint value; and
   wherein the interpolating further comprises, for each parameter of the dynamic haptic effect, calculating each parameter as a function of the interpolation value (t), a corresponding first haptic effect parameter, and a corresponding second haptic effect parameter.

10. The method of claim 9, wherein the dynamic haptic effect is a vibratory haptic effect and comprises a plurality of parameters.

11. The method of claim 10, wherein the plurality of parameters comprise duration, magnitude and period.

12. The method of claim 10, wherein the vibratory haptic effect is generated by an actuator.

13. The method of claim 9, wherein the dynamic event comprises a force.

14. The method of claim 13, wherein the force comprises a simulated object contacting another simulated object.

15. The method of claim 13, wherein the force is generated by a physics system.

16. The method of claim 9, wherein the interpolating comprises, for each parameter of the dynamic haptic effect, calculating each parameter as (1−t)*A+t*B, wherein A comprises the corresponding first haptic effect parameter and B comprises the corresponding second haptic effect parameter.

17. A system that generates a dynamic haptic effect for a dynamic event, the system comprising:
   a processor;
   a memory coupled to the processor and storing a haptic effects generation module;
   receiving by the haptic effects generation module a first endpoint and a second endpoint for dynamic events, wherein the first endpoint comprises a first endpoint value and a corresponding first haptic effect, and the second endpoint comprises a second endpoint value and a corresponding second haptic effect, wherein the first haptic effect comprises a plurality of first parameters and the second haptic effect comprises a plurality of second parameters;
   receiving by the haptic effects generation module a dynamic value for the dynamic event, wherein the dynamic value is between the first endpoint value and the second endpoint value; and
   determining by the haptic effects generation module the dynamic haptic effect from the dynamic value, wherein the determining comprises interpolating the dynamic haptic effect from the first haptic effect and the second haptic effect;
   wherein the interpolating comprises generating an interpolation value (t) that is a function of the first endpoint value, the second endpoint value, and the dynamic value;
   wherein the interpolation value (t) comprises: (dynamic event value−first endpoint value)/(second endpoint value−first endpoint value);
   wherein the first endpoint value is a lowest endpoint value, and the second endpoint value is a highest endpoint value; and
   wherein the interpolating further comprises, for each parameter of the dynamic haptic effect, calculating each parameter as a function of the interpolation value, a corresponding first haptic effect parameter, and a corresponding second haptic effect parameter.

18. The system of claim 17, further comprising an actuator coupled to the processor, wherein the actuator outputs haptic effects in response to receiving the dynamic haptic effect.

19. The system of claim 18, wherein the haptic effects are vibratory haptic effects.

20. The system of claim 17, wherein the interpolating comprises, for each parameter of the dynamic haptic effect, calculating each parameter as (1−t)*A+t*B, wherein A comprises the corresponding first haptic effect parameter and B comprises the corresponding second haptic effect parameter.

21. A non-transitory computer readable medium having instructions stored thereon that, when executed by a processor, cause the processor to generate a dynamic haptic effect for a dynamic event, the generating the dynamic haptic effect comprising:
   receiving a first endpoint and a second endpoint for dynamic events, wherein the first endpoint comprises a first endpoint value and a corresponding first haptic effect, and the second endpoint comprises a second endpoint value and a corresponding second haptic effect;

receiving a dynamic value for the dynamic event, wherein the dynamic value is between the first endpoint value and the second endpoint value; and determining the dynamic haptic effect from the dynamic value, wherein the determining comprises interpolating the dynamic haptic effect from the first haptic effect and the second haptic effect;

wherein the interpolating comprises generating an interpolation value (t) comprising: (dynamic event value−first endpoint value)/(second endpoint value−first endpoint value); and wherein the first endpoint value is a lowest endpoint value, and the second endpoint value is a highest endpoint value.

22. The non-transitory computer-readable medium of claim 21, wherein the first haptic effect comprises a plurality of first parameters and the second haptic effect comprises a plurality of second parameters;

wherein the interpolating comprises, for each parameter of the dynamic haptic effect, calculating each parameter as $(1-t)*A+t*B$, wherein A comprises a corresponding first haptic effect parameter and B comprises a corresponding second haptic effect parameter.

* * * * *